Figure 1:
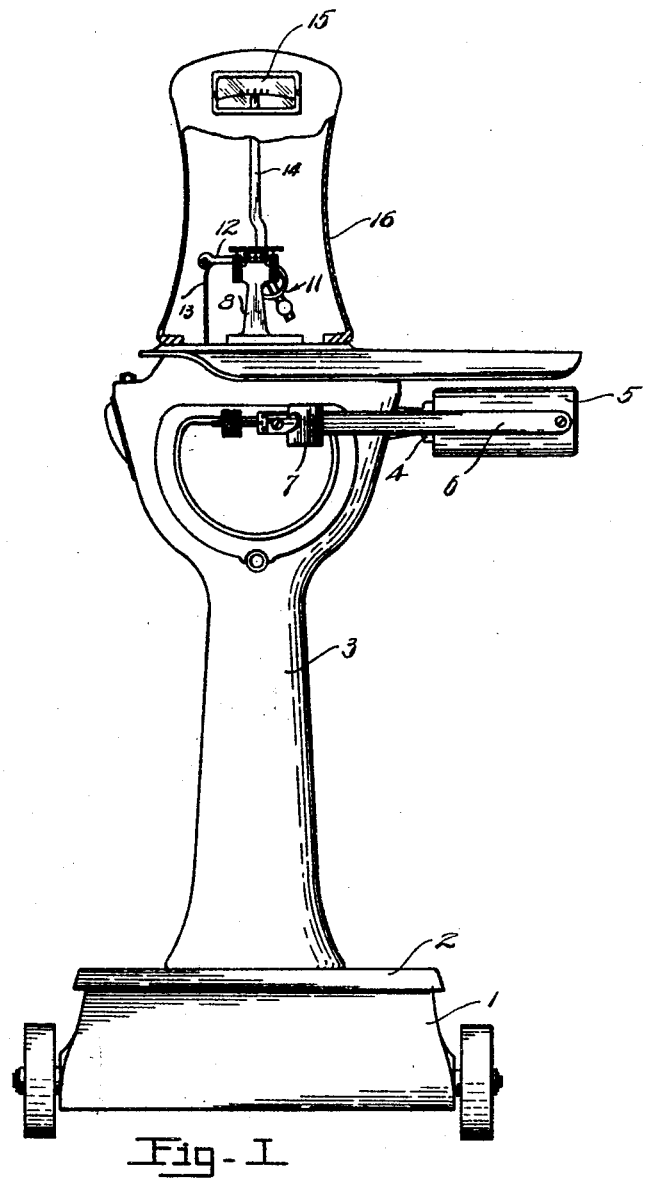

Sept. 8, 1931.  E. G. THOMAS  1,822,549
WEIGHING SCALE
Filed April 8, 1929   2 Sheets-Sheet 1

Inventor
EDWARD G. THOMAS
By C.O.Marshall
Attorney

Sept. 8, 1931. E. G. THOMAS 1,822,549
WEIGHING SCALE
Filed April 8, 1929 2 Sheets-Sheet 2
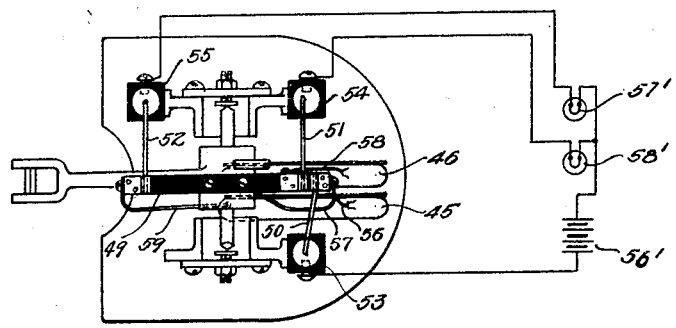
Fig-III
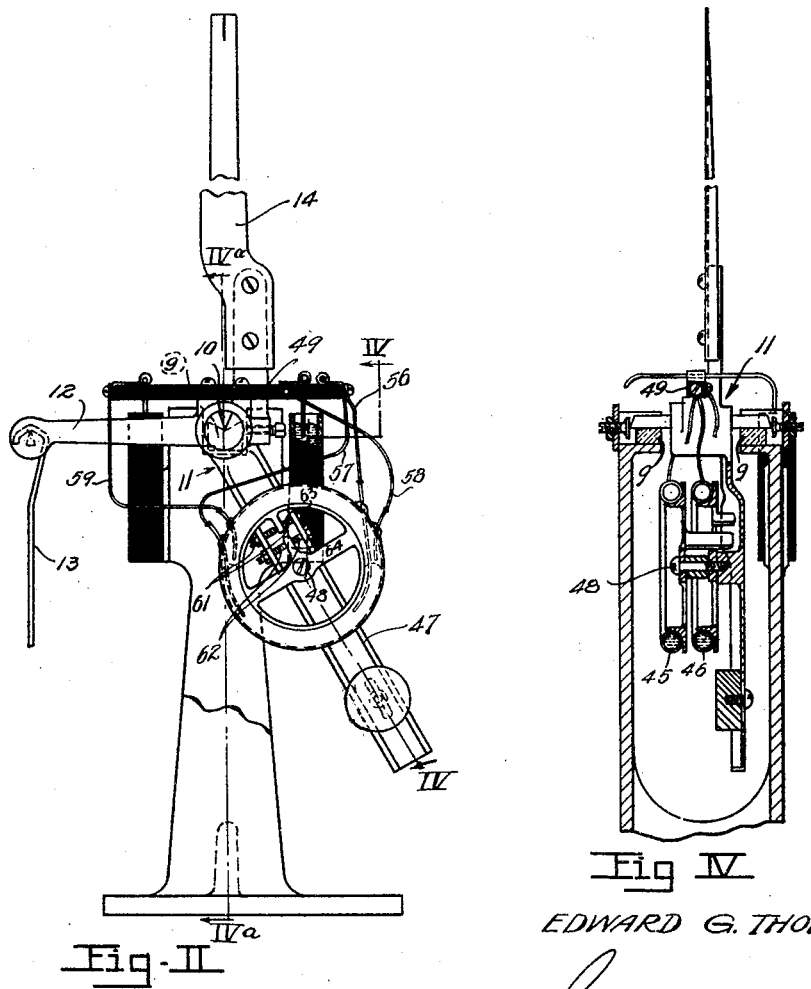
Fig-II  Fig IV
Inventor
EDWARD G. THOMAS
By E. C. Marshall
Attorney Patented Sept. 8, 1931

1,822,549

UNITED STATES PATENT OFFICE

EDWARD G. THOMAS, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed April 8, 1929. Serial No. 353,377.

This invention relates to improvements in weighing scales and particularly to scales which are adapted to weigh a large number of packages of like weight, in which the amount, over or under the predetermined amount, is indicated.

One of the principal objects of this invention is the provision of a frictionless "make and break" electric switch.

Another object is the provision of means whereby an electric current is opened or closed at a predetermined position.

Another object is the provision of means whereby a far visible indication of the condition of balance is given.

A further object is the provision of means whereby an indication of the condition of balance is given at a point remote from the scale.

A still further object is the provision of means adapted to control mechanical feeding devices.

Other objects and advantages will be apparent from the following description, in which reference is had to the accompanying drawings illustrating a preferred embodiment of my invention, and wherein similar reference numerals designate similar parts throughout the several views.

In the drawings:—

Figure I is a front elevational view of the scale, having a portion of the indicating housing broken away;

Figure II is an enlarged front elevational view of a pendulum mechanism embodying my invention;

Figure III is a plan view, and

Figure IV is a fragmentary side elevational view in which the pendulum is sectioned substantially along the line IV—IV of Figure II and the stand 8 is sectioned substantially along the line IVa—IVa of Figure II.

Referring to the drawings in detail, the base 1 has supported therein the lever mechanism (not shown) on which is mounted the platform 2 which is adapted to receive the commodity to be weighed. Secured to the rear of the base 1 is an upwardly extending column 3 in which is pivotally supported the tare beam lever 4, a portion of which extends through an opening in the column. To counterbalance the weight of the levers, platform and other parts, the lever weight 5 is secured to the projecting portion of the lever. Secured to the lever 4 and the weight 5 and lying laterally thereof is the tare beam 6 and slidably mounted thereon is the poise 7. The tare beam 4 is pivotally connected to the platform mechanism by a rod (not shown).

When it is desired to weigh commodity, the poise 7 is moved on the beam towards the right to a point where its weight moment just balances the desired amount of the commodity on the platform. The mechanism as heretofore described is a complete beam scale. It is well known that in beam scales the position of the beam in a "trig loop" is the only indication of the weight provided. The judgment of the operator, as to when balance has been established, really determines the load. For the accurate weighing of the higher priced commodities, however, more efficient indicating means must be provided.

In the scale embodying the present invention this is accomplished by mounting a fulcrum stand on the top of the column 3. This stand is provided with suitable agate bearings 9 which with the pivot 10 form the fulcrum of the pendulum 11. The arm 12 which is a part of the pendulum 11, is pivotally connected to the tare beam lever 4, by the member 13. Secured to and upwardly extending from the pendulum 11 is an indicator 14. The indicator 14, co-operates with a chart 15 fixed in a housing 16 mounted on the column 3, to show the condition of balance. This chart may be marked with a predetermined weight mark and graduations indicating ounces over and under the predetermined weight.

The scale as heretofore described is similar in construction and operation to the scale described in Patent No. 1,606,970 to Thomas. As scales of this type are frequently used for check weighing of bags of commodity, as they are filled on an automatic packing machine, it is at times desirable to equip the scale with an ocular indicating means which is visible at some distance from the scale. It is also necessary, at times, to control mechanical feeding mechanism, electrically, with this scale. As any mechanism attached to the weighing members of a scale must work with the least possible amount of friction, the present invention has as one of its objects the provision of an anti-friction control switch.

Two annular glass tubes 45 and 46 are adjustably mounted on the depending stem 47 of the pendulum 11, and retained by a screw 48. A bar 49, made of di-electric material is fixed to the top of the pendulum 11. Secured thereto are metallic plungers 50, 51 and 52. These plungers dip into wells 53, 54 and 55, also made of di-electric material and filled with metallic mercury. A wired circuit connects the mercury in the wells with an electric current source 56' and electrical devices 57' and 58'.

The annular glass tubes 45 and 46, which are secured to the pendulum 11, are filled to about one half of their circumference with metallic mercury. The plungers 50, 51 and 52 secured to the di-electric bar 49 by metallic clips, have also secured thereto the lead wires 56, 57, 58 and 59. The lead wire 56' which has one of its ends secured to the clip which retains the plunger 50, penetrates the wall of the annular glass tube 45 and enters the therein contained mercury. The lead wire 59 which is attached to the clip which retains the plunger 52, enters the annular tube on the opposite side. This wire, however, does not contact the mercury in the tube when the pendulum is in the balanced position.

The lead wires 57 and 58 similarly penetrate the walls of the annular ring 46. The wire 57 enters the mercury, within the tube, on the opposite side on which the wire 56 enters the mercury in the tube 45. To accurately adjust the space between the ends of the lead wires 58 and 59 and the meniscus of the mercury column in the annular tubes 45 and 46, an adjustment is provided for each. These adjustments comprise adjusting screws 61 and 62, threaded into apertures in the flanges of the depending stem 47 of the pendulum 11. The ends of these screws contact tongues 63 and 64 respectively, which are a part of the frames supporting the annular glass tubes, and are capable of turning these around the fulcrum and retaining screw 48 and locking them in position when adjusted.

Assuming that it is desired to check weigh barrels of flour, on the scale embodying the invention, as they are filled on the packing machine, the poise 7 is moved to the right on the beam 6 to the point where it is capable of counterbalancing 196 pounds on the platform, plus the weight of the barrel or sack in which the flour is contained. As it is very difficult to adjust the automatic packing machines to deliver the flour or other comminuted material, within the close tolerances required, there is always a slight variation. When the weight is greater than is offset by the poise 7 on the beam 6, the unbalanced portion, acting through the connection 13, will swing the pendulum 11 outwardly and upwardly until the weight of this unbalanced portion is offset by the increasing weight moment of the pendulum.

When the weight of the material in the container is less than the pre-determined amount, the cycle of operation is reversed. The decreased weight moment of the descended pendulum counter-acts the deficiency, and this amount is similarly indicated on the "under" side of the chart 15.

The check weigher, however, is not concerned with the amount of the deficiency or excess, as it is his duty to adjust the amount of the material to the predetermined weight. I have provided the electrically illuminated indicating means to enable the operator to more readily determine when this has been attained.

The plungers 50, 51 and 52 are constantly contacting the mercury in the wells 53, 54 and 55 which is permanently connected with the current source 56' and the lamps or other electrical devices 57' and 58'. The lead wires 56' and 57' are also constantly in contact with the mercury in the annular tubes. There are two circuits, one controlling the device 57' and the other the device 58'. When the scale is in balance, that is, the load on the platform is exactly offset by the weight moment of the poise both circuits are broken and the devices are therefore not operating. When due to over-weight on the platform, the pendulum is swung outwardly and upwardly, the mercury contained in the annular tube 45 seeks to regain its hydrostatic balance, according to the laws governing fluids, and in doing so closes the gap in the circuit controlling the device 57' and starting it. When due to underweight, the pendulum descends, the rising meniscus contacts the end of the lead wire 58 which penetrates the wall of the annular tube 46, the device 59' is started.

They are, in case these devices are lamps, colored differently thus instantly and unmistakably indicating a deficiency or excess in the load.

It will be readily seen that different mechanisms may thus be controlled, for example means for controlling material feeding mechanism. When this is the case, the scale embodying my invention, in conjunction with such feeding mechanisms may be used as an automatic packing scale.

The above description of my invention is to be regarded as illustrative only and it is to be understood that the invention is susceptible to variation, modification and change within the spirit and scope of the subjoined claims.

Having described my invention, I claim:
1. In a device of the class described, in combination, a load receiver and load counterbalancing means connected thereto, for offsetting loads, indicating means operatively connected to said offsetting means, a switch adjustably attached to said counterbalancing means and operated by the movement of said indicating means and mechanism controlled by said switch.

2. In a device of the class described, in combination, a load receiver and load offsetting means including an adjustable pendulum, an electric make and break switch adjustably secured to said pendulum in a manner, that when said make and break switch is adjusted, said pendulum is not thrown out of adjustment.

3. In a device of the class described, in combination, a load receiver and load counterbalancing means connected thereto for offsetting loads, indicating means mounted on a stationary support, and operatively connected to said counterbalancing means, a mercury contact switch, adjustably mounted on said counterbalancing means, electrical means controlled by said mercury contact switch, an electrical current source in circuit with said electrical means and anti-friction contacts for leading said electrical current to said mercury contact switches.

4. In a device of the class described, in combination, a load receiver and load counterbalancing means connected thereto for offsetting loads, indicating means to show the condition of balance mounted on a stationary support, and operatively connected to said counterbalancing means, a plurality of mercury contact switches mounted on said indicating means, said switches being operated by the movement of said indicating means, an electrical current source and electrical devices, wired circuits connecting said electrical current source and said electrical devices with said mercury contact switches, said wired circuits having anti-friction contacts for conveying said electrical current from said stationary support to said moving indicating means, said mercury contact switches controlling said electrical devices.

5. In a device of the class described, in combination, a commodity receiver and load counterbalancing means connected thereto, movable indicating means mounted on a stationary support, and co-operating with a chart to show the condition of balance, a switch mounted on said movable counterbalancing means, an electrical current source and electrical devices controlled by said switch, and means including an anti-friction contact for conveying said electrical current to said electrical devices and said switch, said anti-friction contact comprising wells containing mercury secured to said stationary support and plungers submerged in said mercury and secured to said movable indicating means.

6. In a device of the class described, in combination, weighing mechanism including a tiltable member and a gravity operated switch supported upon said tiltable member, the construction and arrangement being such that the center of mass of a relatively movable portion of said switch is maintained in a vertical line passing through a given point on said tiltable member.

7. In a device of the class described, in combination, weighing mechanism including a tiltable member and a gravity operated switch carried by said tiltable member, the construction and arrangement being such that upon tilting of said tiltable member a portion of said switch is moved by gravity through a circular arc curved about a point on said tiltable member.

8. In a device of the class described, in combination, weighing mechanism including a tiltable member and a gravity operated switch carried by said tiltable member, said switch including a tube curved along an arc of a circle and conducting material adapted to travel within said tube along the lowermost portion of said arc.

9. In a device of the class described, in combination, weighing mechanism including a tiltable member, a tube having a portion curved about an arc of a circle carried by said tiltable member, conductor terminals extending into the interior of said tube, and mercury partially filling said tube and adapted to contact said terminals upon tilting movement of said tiltable member.

10. In a device of the class described, in combination, weighing mechanism including a tiltable member, a circular glass tube supported thereon, conductor terminals extending into the interior of said tube, and mercury partially filling said tube and adapted to contact said terminals upon movement of said tiltable member.

11. In a device of the class described, in combination, weighing mechanism including a load-counterbalancing pendulum, a circular glass tube supported thereon, conductor terminals extending into the interior of said tube, and mercury partially filling said tube and adapted to contact said terminals upon movement of said load-counterbalancing pendulum.

EDWARD G. THOMAS.